UNITED STATES PATENT OFFICE.

CHRISTOPHER RIS, OF BASLE, SWITZERLAND, ASSIGNOR TO JOHN R. GEIGY & CO., OF SAME PLACE.

BROWN DYE-STUFF.

SPECIFICATION forming part of Letters Patent No. 455,952, dated July 14, 1891.

Application filed November 25, 1890. Serial No. 372,615. (Specimens.)

*To all whom it may concern:*

Be it known that I, CHRISTOPHER RIS, of Basle, Switzerland, have invented certain new and useful Brown Dye-Stuffs, of which the following is a specification.

My invention relates to a new discovery of brown coloring-matter which can be diazotized upon the fiber and then combined with phenols or amines, these properties being similar to those of Green's primuline. The new dye-stuff is formed by condensation of paranitro-toluol sulpho-acid with paraphenylendiamine or paratoluylendiamine in a solution of caustic alkalies.

As an example I give the following description: Sixteen kilograms of paranitro-toluol sulpho-acid and eight kilograms of paraphenylendiamine are dissolved in fifty liters of boiling water, and then twelve kilograms of caustic-soda lye of forty degrees Baumé are added. The reaction is rapid. The new dye-stuff thus formed is then precipitated with common salt or the whole mass dried. It forms a brown-colored powder, easily soluble in water, with yellow-brown color; soluble in concentrated sulphuric acid, with red-violet color; soluble in methylalcohol, less soluble in ethylalcohol and concentrated acetic acid, and scarcely soluble in benzol and ether. One molecule of paranitro-toluol sulpho-acid in reaction requires about one molecule of nitrite of sodium. Therefore I suppose that the reaction can be described as follows:

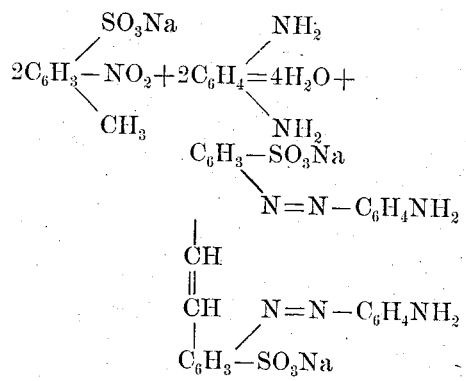

Unmordanted cotton can be dyed in brown shades in an alkaline or neutral bath, to which chloride of ammonia may be added. After being washed it is then passed into an acidulated solution of nitrite of sodium, which turns it first black and then brown, and after a repeated thorough washing the fiber is passed through an alkaline solution of naphthols to obtain claret-like colors, or through a solution of metaphenylendiamine or resorcin to obtain brown or delta-naphthylamine to obtain black. The colors developed in this way are very deep and very fast to soap.

What I claim as new, and desire to secure by Letters Patent, is—

The brown dye derived from a mixture of paranitro-toluol sulpho-acid with paraphenylendiamine in a solution of caustic alkalies, said dye being soluble in water and alcohol, substantially as shown and described.

In testimony whereof I hereunto sign my name, in the presence of two subscribing witnesses, this 1st day of October, 1890.

CHRISTOPHER RIS.

Witnesses:
GEORGE GIFFORD,
CHS. A. RICHTER.